United States Patent Office 2,929,461
Patented Mar. 22, 1960

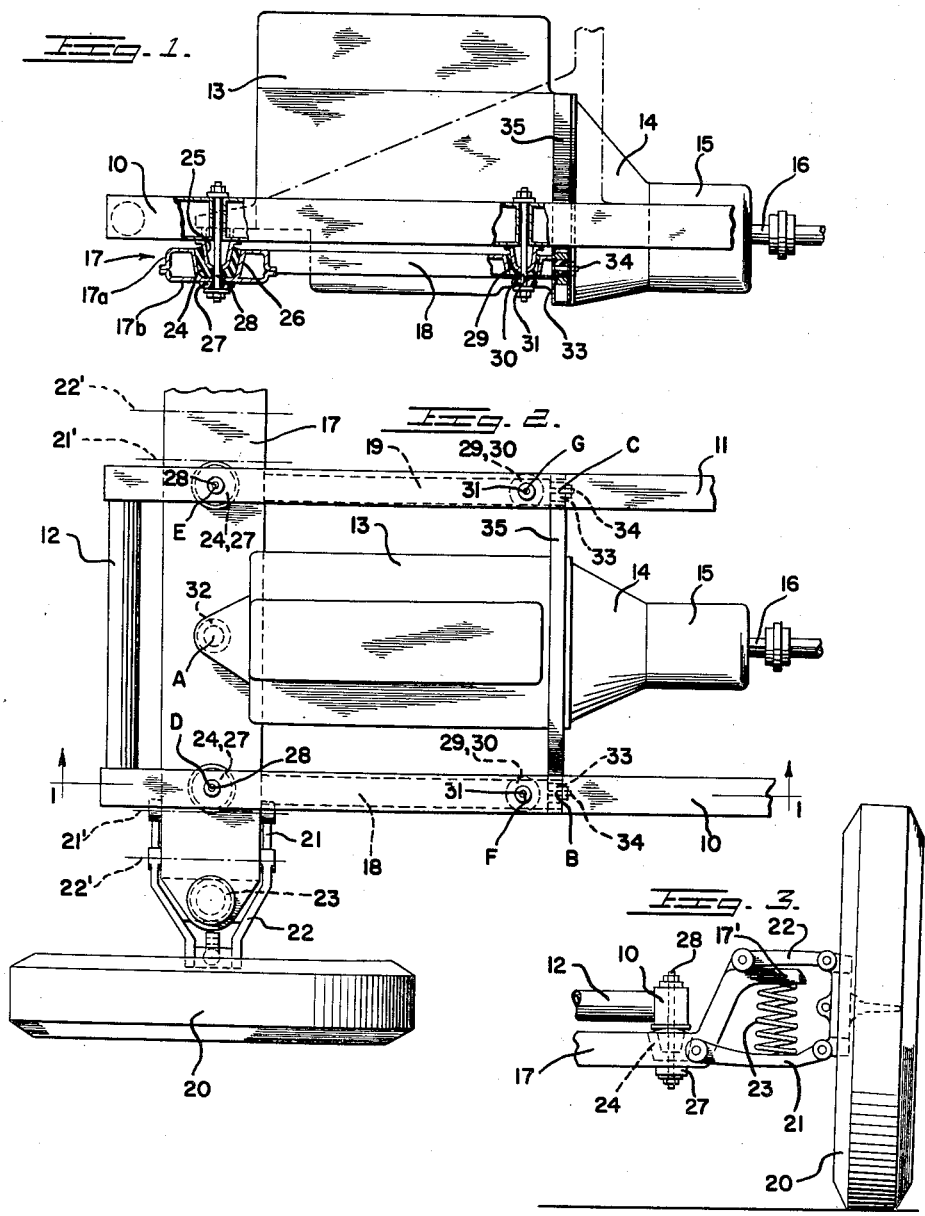

2,929,461

ELASTIC SUSPENSION OF A DRIVE AGGREGATE IN A MOTOR VEHICLE

Alfred F. Rothweiler, Esslingen-Hegensberg, and Arthur Mischke, Sulzbach (Murr), Germany, assignors to Daimler-Benz Aktiengesellschaft, Stuttgart-Unterturkheim, Germany Application March 26, 1956, Serial No. 573,803

Claims priority, application Germany March 31, 1955

18 Claims. (Cl. 180—64)

The present invention relates to the elastic suspension of a drive aggregate, especially of a drive axle aggregate at the vehicle superstructure by the use of an essentially U-shaped auxiliary frame.

It is a primary object of the present invention to provide such a suspension of the drive aggregate in a motor vehicle which enables the use of a simple construction of an auxiliary frame as well as a support of the drive-axle aggregate on the auxiliary frame which is as stable as possible.

Accordingly, it is an object of the present invention to provide an auxiliary frame which is rugged, relatively inexpensive to manufacture and simple in structure.

It is another object of the present invention to provide a suspension of the drive aggregate on the auxiliary frame which effects as stable as possible a suspension of the drive aggregate on the auxiliary frame.

A still further object of the present invention is the provision of a support of the drive aggregate on such an auxiliary frame which is made of simple tubular or stamped sheet metal parts.

Still another object of the present invention resides in the provision of such an arrangement for the suspension of the drive aggregate on the auxiliary frame which produces a particularly favorable elastic suspension thereof.

A further object of the present invention resides in the suspension of the drive aggregate on the auxiliary frame which enables the use of elastic members disposed in essentially the same transverse planes in which are also located the suspension of the auxiliary frame on the main frame or chassis of the vehicle.

Still another object of the present invention resides in the provision of rubber buffers which are arranged so as to simultaneously absorb all the forces in a particularly favorable manner regardless of the direction of such forces and the nature thereof, i.e., static or dynamic forces.

A still further object of the present invention resides in the provision of a transverse plate member for purposes of achieving the elastic suspension of the drive aggregate on the auxiliary frame which plate member may be inserted between the engine and the flywheel-clutch housing of the drive aggregate.

Further features, objects and advantages of the present invention will become more obvious from the following description when taken in connection with the accompanying drawing which shows, for purposes of illustration only, one preferred embodiment in accordance with the present invention and wherein:

Figure 1 is a side view of the suspension of the drive aggregate on the auxiliary frame and the auxiliary frame on the vehicle superstructure, partially in cross section taken along line 1—1 of Figure 2.

Figure 2 is a plan view of the arrangement according to Figure 1, and

Figure 3 is a partial front view of the auxiliary frame with the wheel suspension thereon as seen from the left in Figure 2.

The term "superstructure" is used hereinafter to designate the main frame of the vehicle or the chassis or frame of a self-supporting vehicle body or the like, while the term "drive aggregate" is used hereinafter to designate the power unit which includes the engine and possibly also the flywheel-clutch housing and transmission housing.

Referring now to the drawing wherein like reference numerals are used throughout the various views to designate like parts, the main frame which, for example, may be combined with the body of the vehicle into one unit comprises the longitudinal bearer members 10 and 11 which are connected with each other by a plurality of cross bearer members of which only the cross bearer member 12 located at the front end of the vehicle is shown.

The drive aggregate which consists, for example, of the engine 13, the flywheel and the clutch housing 14, and the transmission housing 15 and which, for example, drives the rear wheels over a Cardan shaft 16, is elastically supported on the auxiliary frame at three points A, B and C while the auxiliary frame 17, 18, 19 in its turn is elastically supported at the main frame 10, 11, 12 at four points D, E, F and G. As seen in Figure 1 the several points A through G at each of which there is an elastic support are all disposed in substantially the same generally horizontal plane.

The essentially U-shaped auxiliary frame which surrounds the drive aggregate from in front thereof consists of a cross bearer member 17 which is formed as a hollow bearer member and is composed, for example, of two stamped or pressed sheet metal parts 17a and 17b as well as of a hollow tubular or box-shaped arm portions 18 and 19 which are directed rearwardly in the longitudinal direction of the vehicle. The arm portions 18 and 19 are rigidly secured with the cross bearer member in any suitable manner, for example, by welding.

The steerable front wheels 20 are independently suspended at the lateral ends of the hollow cross bearer member 17 of the auxiliary frame by means of guide arms or links 21 and 22 disposed one above the other and pivotally secured to the hollow cross bearer member 17 about pivot axes 21' and 22' respectively and by means of helical or coil springs 23 which abut with the lower ends thereof against a cross plate or support (not shown) of the lower link 21 and with the upper ends thereof against the abutment member 17' which is formed by the upwardly and outwardly extending portion of the hollow cross bearer member 17.

An essentially bell-shaped rubber buffer 24 serves as connection at points D and E between the hollow cross bearer member 17 of the auxiliary frame with the longitudinal bearers 10 and 11 of the vehicle superstructure. The rubber buffer 24 is supported between an inner sheet metal part 25 secured to or forming part of the main frame or vehicle superstructure 10, 11 which inner sheet metal part 25 may be in the shape of a bell or truncated cone, and an outer sheet metal part 26 secured to or forming part of the auxiliary frame which is shaped correspondingly. The rubber buffer 24 transmits essentially the weight of the vehicle or of the drive aggregate 13, 14, 15 to the auxiliary frame 17, 18, 19 and also absorbs horizontally directed forces. In order to effectively absorb vertical forces directed in the opposite direction, i.e., directly upwardly as contrasted to the downwardly directed forces of the weight of the vehicle body and of the drive aggregate, a further annularly-shaped rubber buffer 27 is provided which is pre-stressed together with the bell-shaped rubber buffer 24 by means of a tightening bolt 28 which upon tightening thereof pre-stresses the rubber buffers 24 and 27.

The tubularly-shaped arm portions 18 and 19 of the auxiliary frame are connected with the superstructure or main frame of the vehicle at the points F and G in a similar manner. Bell-shaped rubber buffers 29 and annularly-shaped rubber buffers 30 which correspond to rubber buffers 24 and 27 respectively and which absorb oppositely directed forces are also used at the points of support F and G, whereby the rubber buffers 29 and 30 may again be pre-stressed by tightening bolts 31.

The drive aggregate is supported at the forward end thereof on the auxiliary frame at the center point A in the transverse plane which contains the support points D and E of the auxiliary frame on the superstructure, preferably by means of essentially vertically arranged rubber buffers 32.

The rear support of the drive aggregate on the auxiliary frame in the points B and C takes place by rubber sleeves 33 which are slipped over the pins or plug members 34 which extend in the longitudinal direction of the vehicle and which, for example, are welded to the ends of the tubularly-shaped arm portions 18 and 19. The rubber sleeves or bushings 33, on the other hand, are inserted into bores provided in a cross bearer member 35 projecting to the sides of the engine 13 and which may be in the form of a plate inserted between the engine 13 and the flywheel-clutch housing 14. The cross bearer plate 35 may be so constructed that the bolts normally used to tighten the flanges of the engine and flywheel-clutch housings extend therethrough and are used to secure the same in place between the engine 13 and the flywheel clutch housing 14. The points B and C of the support of the drive aggregate on the auxiliary frame are thereby arranged in proximity to that cross plane which contains the support points F and G serving as elastic connections of the ends of the arm portions 18, 19 of the auxiliary frame with the vehicle main frame or vehicle superstructure.

Instead of using rubber buffers 32 and 33, differently-shaped rubber buffers may also be used. For example, rubber buffers may be provided which possess a greater volume of rubber. Furthermore, the support of the drive aggregate on the auxiliary frame may take place at all points by means of rubber rings with vertical or inclined axes. Furthermore, the arms 18 and 19 of the auxiliary frame may be connected, for example, at or near the ends thereof by means of a cross bearer member which rigidly connects the arms 18 and 19 with each other in reinforcing relationship.

While we have shown and described one preferred embodiment in accordance with the present invention, it is understood that the same is subject to many changes and modifications within the spirit of the present invention and we intend to cover such changes and modifications except as defined by the appended claims.

We claim:

1. In a motor vehicle, a vehicle superstructure having essentially coplanar longitudinal bearer members, an essentially U-shaped auxiliary frame, a drive aggregate, first elastic means for elastically supporting said vehicle superstructure on said auxiliary frame in essentially two transverse planes, and second elastic means for elastically supporting said drive aggregate on said auxiliary frame in essentially two transverse planes approximately coinciding with said first-mentioned two transverse planes, said first elastic means and said second elastic means being disposed in approximately the same generally horizontal plane, said auxiliary frame being formed of a hollow cross bearer member extending essentially transversely of the vehicle and of two coplanar lateral tubular arm portions secured to said hollow cross bearer member and extending essentially in the longitudinal direction of the vehicle and generally parallel to said coplanar longitudinal bearer members.

2. In a motor vehicle, a vehicle superstructure having essentially coplanar longitudinal bearer members, an essentially U-shaped auxiliary frame, a drive aggregate, first elastic means for elastically supporting said vehicle superstructure on said auxiliary frame in essentially two transverse planes, second elastic means for elastically supporting said drive aggregate on said auxiliary frame in essentially two transverse planes approximately coinciding with said first-mentioned two transverse planes, said first elastic means and said second elastic means being disposed in approximately the same horizontal plane, one wheel on each side of said auxiliary frame disposed opposite one another, and means for independently suspending said wheels on said auxiliary frame, said auxiliary frame being formed of a hollow cross bearer member extending transversely of the vehicle, and of two coplanar lateral tubular arm portions secured to said hollow cross bearer member and extending essentially in the longitudinal direction of the vehicle parallel to said coplanar longitudinal bearer members.

3. In a motor vehicle the combination according to claim 2 wherein said means for independently suspending said wheels on said auxiliary frame comprises an upper and a lower guide link on each side of the vehicle pivotally secured to said hollow transversely extending cross bearer member and wheel springs each abutting against a respective lower guide link and against said transversely extending cross bearer member.

4. In a motor vehicle, a vehicle superstructure, an essentially U-shaped auxiliary frame consisting of a hollow transversely extending sheet metal cross bearer member and two longitudinally extending tubular members, a drive aggregate, means including elastic rubber buffers for elastically supporting said vehicle superstructure on said auxiliary frame, and means including elastic rubber buffers for suspending the entire weight of said drive aggregate on said auxiliary frame, said first-mentioned rubber buffers being disposed in essentially two transverse planes, said second-mentioned rubber buffers being disposed in essentially two transverse planes approximately coinciding with said first-mentioned two transverse planes, said first-mentioned rubber buffers between the auxiliary frame and the vehicle superstructure being so constructed and arranged as to absorb both horizontal and vertically directed forces, all of said elastic rubber buffers being arranged in substantially the same generally horizontal plane.

5. In a motor vehicle the combination according to claim 4 wherein said second-mentioned elastic rubber buffers consist of an essentially vertically disposed front rubber buffer for supporting the front end of said drive aggregate on said auxiliary frame and of essentially longitudinally disposed rubber bushings which support the rear end of said drive aggregate on said tubular members.

6. In a motor vehicle the combination according to claim 4 wherein said drive aggregate includes a projecting transversely extending plate supported by said second-mentioned rubber buffers at the rear ends of said tubular members, respectively.

7. In a motor vehicle, a vehicle superstructure, an essentially U-shaped auxiliary frame consisting of a hollow transversely extending sheet metal cross bearer member and two longitudinally extending tubular members, a drive aggregate, means including elastic rubber, buffers for elastically supporting said vehicle superstructure on said auxiliary frame, and means including elastic rubber buffers for suspending the entire weight of said drive aggregate on said auxiliary frame, said rubber buffers being disposed in essentially two transverse planes, said first-mentioned rubber buffers comprising bell-shaped members subjected to shearing stress by the weight of said vehicle superstructure and for absorbing horizontally directed forces and axially opposite annular rubber bearer members for absorbing vertical forces, all of said elastic rubber buffers being arranged in substantially the same generally horizontal plane.

8. In a motor vehicle the combination according to claim 7 wherein said superstructure and said auxiliary frame are each provided with concentric bell-shaped housings enclosing therebetween said bell-shaped members of said first-mentioned rubber buffers, the axes of said bell-shaped members being essentially vertical.

9. In a motor vehicle, a vehicle superstructure, an essentially U-shaped auxiliary frame consisting of a hollow transversely extending sheet metal cross bearer member and two longitudinally extending tubular members secured thereto, a drive aggregate, means including elastic rubber buffers for elastically supporting said vehicle superstructure on said auxiliary frame at four points disposed in two transverse planes, and means including elastic rubber buffers for suspending the entire weight of said drive aggregate on said auxiliary frame at three points disposed essentially in said two transverse planes, said first-mentioned rubber buffers being formed of bell-shaped members subjected to shearing stress by the weights of said superstructure and for absorbing horizontal forces and axially opposite annular rubber bearer members for absorbing vertical forces, substantially complementary bell-shaped parts for enclosing said first-mentioned bell-shaped members therebetween secured to said vehicle superstructure and said auxiliary frame, and means for adjustably prestressing said first-mentioned rubber buffers, all of said elastic rubber buffers being arranged in substantially the same generally horizontal plane.

10. In a motor vehicle the combination according to claim 9, wherein said second-mentioned rubber buffers consist of an essentially vertical rubber buffer supporting the front end of said drive aggregate on said hollow transversely extending cross bearer member essentially in the center thereof, and of two essentially horizontally disposed rubber bushings for supporting the rear end of said drive aggregate, and two longitudinally extending pins secured to one of said drive aggregate and said auxiliary frame over which pins said rubber bushings are slipped, said bushings being connected with the other of said drive aggregate and said auxiliary frame.

11. In a motor vehicle the combination according to claim 10, wherein said drive aggregate includes an engine, a clutch housing and a transverse plate member inserted therebetween and wherein said pins are secured to the ends of said longitudinally extending tubular members while said rubber bushings are secured in appropriate bores of said transverse plate member.

12. In a motor vehicle the combination according to claim 11, further comprising wheel suspension means secured to said hollow cross bearer member of said auxiliary frame on both sides thereof, said wheel suspension means including upper and lower guide arms pivotally secured to said hollow cross bearer member, said hollow cross bearer member being provided with an outwardly projecting abutment surface on each side thereof, and spring means abutting with the lower ends thereof against said lower guide arms and with the upper ends thereof against said abutment surfaces.

13. In a motor vehicle the combination as set forth in claim 1, wherein said elastic means for elastically supporting said vehicle superstructure on said auxiliary frame are connected to the corners of said auxiliary frame in close proximity with said vehicle superstructure for defining the broadest possible support means and thereby providing a stable support.

14. In a motor vehicle the combination according to claim 1, wherein said drive aggregate is elastically supported at only one point on said hollow cross bearer member and at said rear ends of said two tubular arm portions by the second-named elastic support means.

15. In a motor vehicle, a vehicle superstructure, an essentially U-shaped auxiliary frame, a drive aggregate, elastic means for elastically supporting said vehicle superstructure on said auxiliary frame in essentially two transverse planes, and means for elastically supporting said drive aggregate on said auxiliary frame, said auxiliary frame being formed of a hollow cross bearer member extending essentially transversely of said vehicle and of two essentially longitudinally extending lateral tubular arm portions secured at the forward ends thereof to said hollow cross bearer member and secured at the rear ends thereof to said drive aggregate, said drive aggregate including a transversely extending plate by means of which the drive aggregate is supported at said rear ends exclusively on said auxiliary frame by said second-mentioned elastic means, each of the points of elastic support between the vehicle superstructure and said auxiliary frame and between the auxiliary frame and the drive aggregate being located substantially in the same generally horizontal plane.

16. In a motor vehicle, the combination according to claim 15, wherein said drive aggregate includes an engine and a housing secured thereto, said transversely extending plate being secured between said engine and said housing.

17. In a motor vehicle, a vehicle superstructure, an essentially U-shaped auxiliary frame, a drive aggregate, elastic means for elastically supporting said vehicle superstructure on said auxiliary frame in essentially two transverse planes, and means for elastically supporting said drive aggregate on said auxiliary frame, said auxiliary frame being formed of a hollow cross bearer member extending essentially transversely of said vehicle and of two essentially longitudinally extending lateral tubular arm portions secured at the forward ends thereof to said hollow cross bearer member and secured at the rear ends thereof to said drive aggregate to constitute the sole support for the rear part of the latter, said means for elastically supporting said drive aggregate on said auxiliary frame being situated in essentially two transverse planes approximately coinciding with said first-mentioned two transverse planes, each of the points of elastic support between the vehicle superstructure and said auxiliary frame and between the auxiliary frame and the drive aggregate being located substantially in the same generally horizontal plane.

18. In a motor vehicle, a vehicle superstructure, an essentially U-shaped auxiliary frame, a drive aggregate, elastic means for elastically supporting said vehicle superstructure on said auxiliary frame, said auxiliary frame comprising a cross bearer member extending transversely of said vehicle and of two essentially longitudinally extending lateral arms, elastic means for supporting said drive aggregate on said cross bearer member, a transverse plate secured to said drive aggregate and projecting laterally therefrom to support the drive aggregate at the ends of said arms remote from said cross bearer member, an annular elastic bushing positioned at the end of each of said arms for elastically supporting said plate thereat, a pin positioned at the end of each said arm and rigidly secured to one of said arm and said plate with the bushing thereat receiving said pin and being connected to the other of said arm and said plate, said pins extending generally longitudinally of said vehicle.

References Cited in the file of this patent

UNITED STATES PATENTS

| | | |
|---|---|---|
| 2,044,714 | Trott | June 16, 1936 |
| 2,642,240 | Peirce | Jan. 16, 1953 |
| 2,689,014 | Nallinger | Sept. 14, 1954 |
| 2,746,556 | Nallinger | May 22, 1956 |

FOREIGN PATENTS

| | | |
|---|---|---|
| 1,067,426 | France | Jan. 27, 1954 |
| 662,538 | Great Britain | Dec. 5, 1951 |